United States Patent [19]
Kuo

[11] Patent Number: 5,662,405
[45] Date of Patent: Sep. 2, 1997

[54] LIGHT-EMITTING PEDAL FOR BICYCLES

[76] Inventor: Pao-Hsiu Kuo, P.O. Box 82-144, Taipei, Taiwan

[21] Appl. No.: 602,153

[22] Filed: Feb. 15, 1996

[51] Int. Cl.$^6$ ........................................ B62J 6/00
[52] U.S. Cl. ...................... 362/72; 362/192; 362/249; 362/800; 340/432; 310/67 R; 310/73
[58] Field of Search .................. 362/72, 78, 192, 362/193, 249, 800; 340/432, 480; 310/67 R, 67 A, 73

[56] References Cited

U.S. PATENT DOCUMENTS 3,764,976  10/1973  MacMahon ........................ 362/72
4,775,919  10/1988  Pearsall et al. .................. 362/78
4,782,431  11/1988  Park .................................. 362/78
4,893,877   1/1990  Powell et al. ..................... 362/78

Primary Examiner—Alan Cariaso
Attorney, Agent, or Firm—Alfred Lei

[57] ABSTRACT

A pedal for a bicycle including a body portion formed with a plurality of recesses on a circumference thereof, the body portion being formed with an opening at a central portion thereof, a plurality of light-emitting diodes fitted in respective recesses of the body portion, an axle fitted in the opening, a pair of solenoids installed in the body portion and located at opposite sides of the opening, and a pair of permanent magnets mounted on opposite sides of the axle and disposed between the two solenoids, whereby the pedal will emit light when the bicycle is propelled by the pedal.

1 Claim, 3 Drawing Sheets

LIGHT-EMITTING PEDAL FOR BICYCLES

BACKGROUND OF THE INVENTION

1. Field of the Invention

This invention relates to a pedal for bicycles which will emit light when it is rotated.

2. Description of the Prior Art

It has been found that rear end vehicular collisions are one of the most common accidents occurring on our road systems today and results in countless loss of money, time, and sometimes, life to those involved. Hence, reflectors are commonly used for alerting following drivers of a bicycle. However, the reflector can only reflect light from certain directions thereby often making it too late for the following driver to drive away from a bicycle and therefore still causing accidents.

Therefore, it is an object of the present invention to provide a light-emitting pedal for bicycles which can obviate and mitigate the above-mentioned drawbacks.

SUMMARY OF THE INVENTION

This invention is directed to a light-emitting pedal for bicycles.

It is the primary object of the present invention to provide a pedal for bicycles which will emit light when it is rotated.

It is another object of the present invention to provide a light-emitting pedal for bicycles which can keep the rider from danger.

It is still another object of the present invention to provide a light-emitting pedal for bicycle which is reliable in operation.

It is still another object of the present invention to provide a light-emitting pedal for bicycle which is simple in construction.

It is a further object of the present invention to provide a light-emitting pedal for bicycles which is low in cost.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
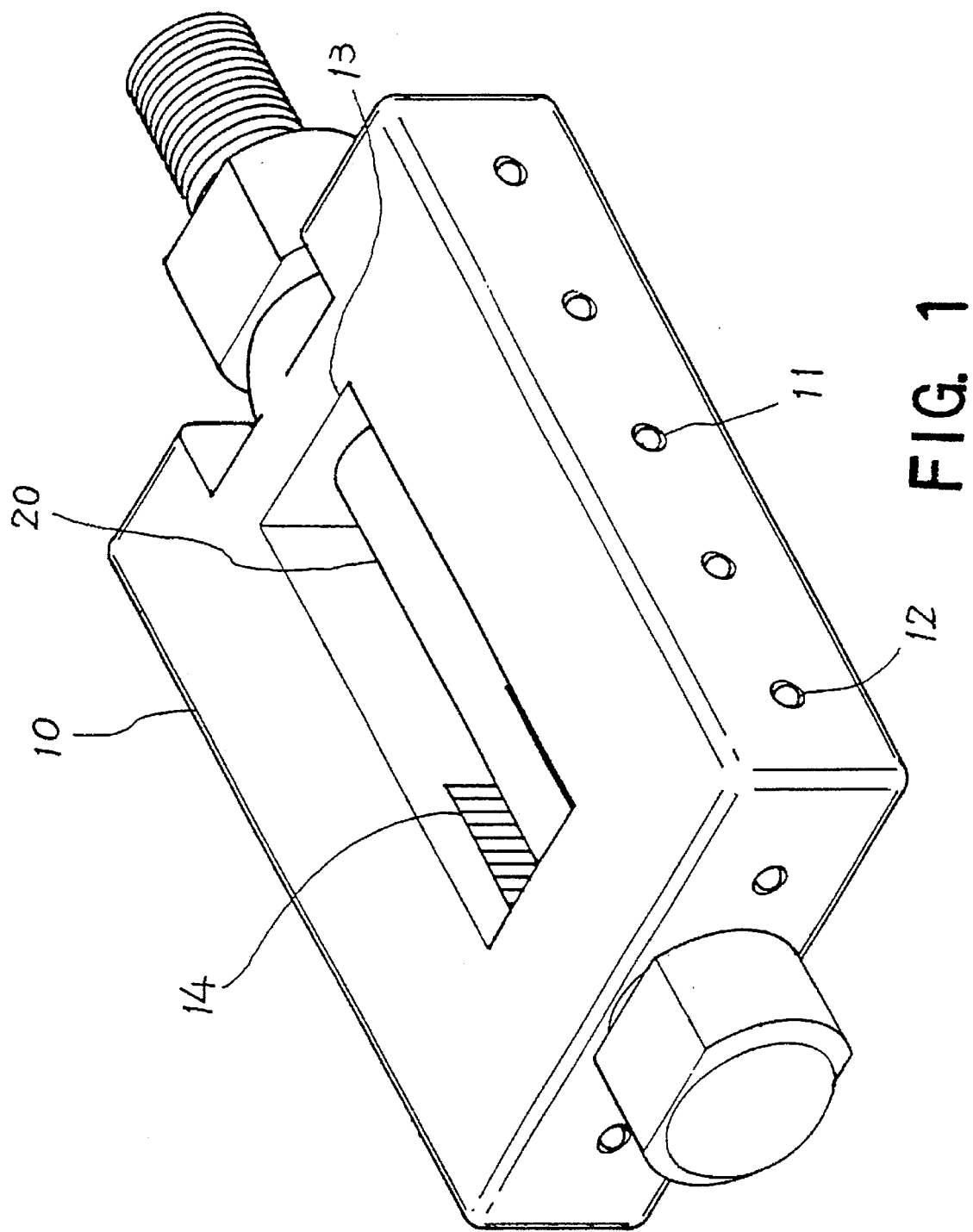
FIG. 1 is a perspective view of present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
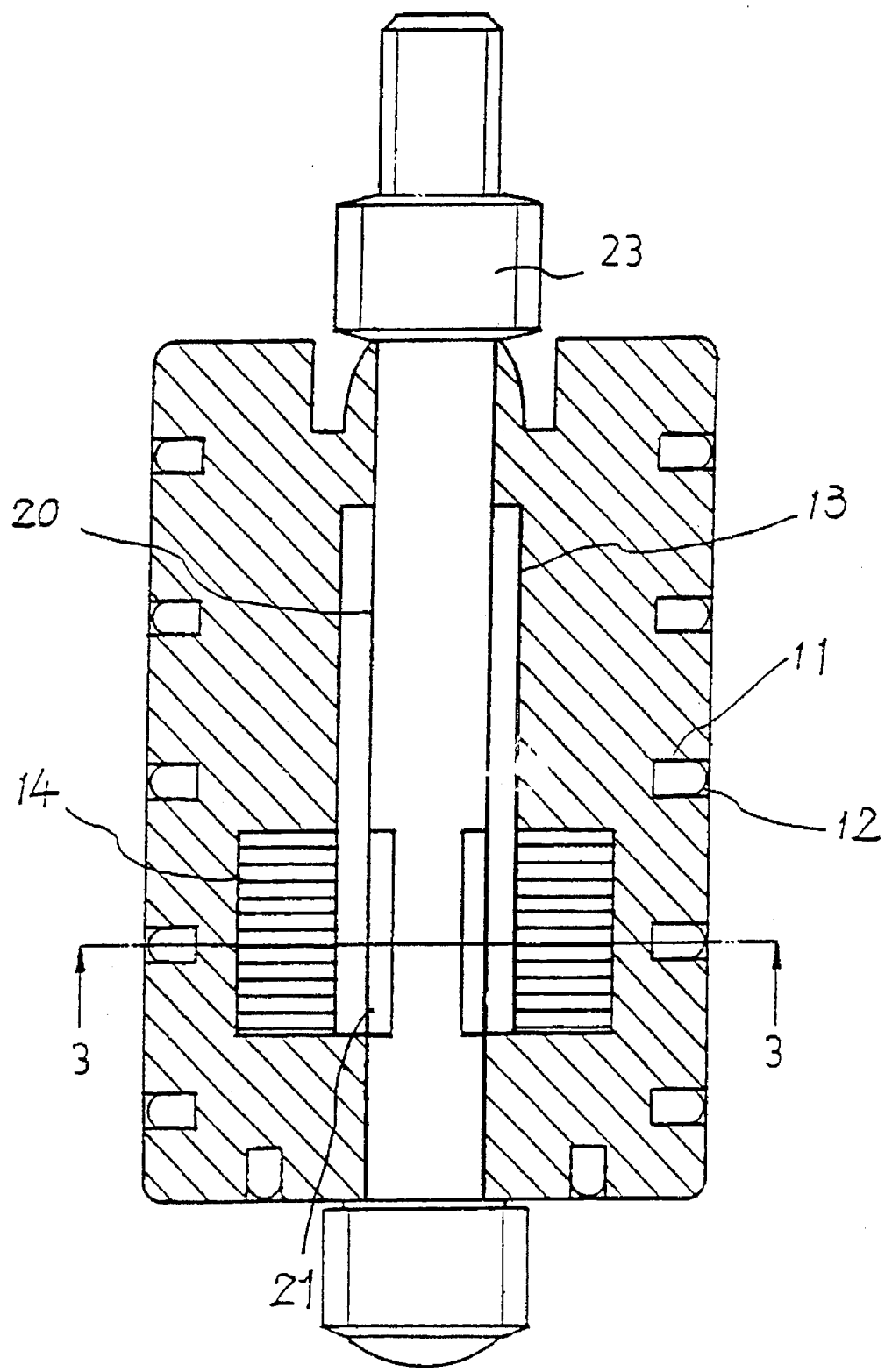
FIG. 2 is a sectional view of the present invention.
Figure 3:
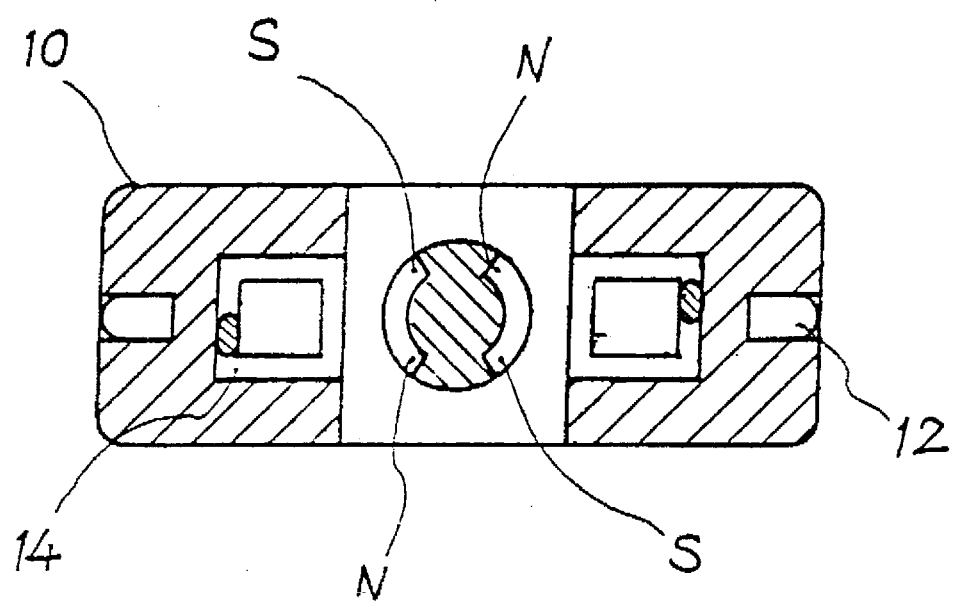
FIG. 3 illustrates the working principle of the present invention.

With reference to the drawings and in particular to FIGS. 1 and 2 thereof, the pedal according to the present invention comprises a body portion 10 formed with a plurality of recesses 11 around its circumference. Within each of the recesses 11 is fitted a light-emitting diode 12. The light-emitting diodes 12 are connected in parallel to two solenoids 14. The connection between the light-emitting diodes 12 and the solenoids 14 may be of any conventional design well known to those skilled in the art and is not considered a part of the invention. The body portion 10 has an opening 13 in its central portion. The two solenoids 14 are installed in the body portion 10 and located at opposite sides of the opening 13. An axle 20 is fitted into the opening 13 of the body portion 10 and engaged with a nut 23 at the end so that the body portion 10 can be rotated about the axle 20. Two permanent magnets 21 are mounted on opposite sides of the bolt 20 and located between the two solenoids 14 (see FIG. 3).

As the bicycle is propelled by using the pedals according to the present invention, the axle 20 will be rotated with respect to the body portion 10 thereby making the solenoids 14 cut through the lines of force and therefore generating an electric current to flow through the solenoids 14 and the light-emitting diodes Accordingly, the light-emitting diodes 12 will blink when the bicycle is propelled by the pedals. Furthermore, the blinking frequencey of the light-emitting diodes 12 is proportional to the angular speed of the bolt 20. Hence, the higher the blinking frequencey of the light-emitting diodes 12 is, the faster the bicycle travels.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. In a bicycle having two pedals, each of said pedals comprising:

a rectangular body portion formed with a plurality of recesses on a circumference thereof, said rectangular body portion being formed with a longitudinal opening at a central portion thereof;

a plurality of light-emitting diodes fitted in respective recesses of said body portion;

an axle extending longitudinally through said rectangular body portion and said longitudinal opening;

a pair of solenoids installed in said rectangular body portion and located at opposite sides of said longitudinal opening; and a pair of permanent magnets mounted on opposite sides of said axle and disposed between said two solenoids.

* * * * *